(12) United States Patent
Yoo

(10) Patent No.: US 11,463,417 B2
(45) Date of Patent: Oct. 4, 2022

(54) ENCRYPTION PROCESSING METHOD AND APPARATUS

(71) Applicant: SAMSUNG SDS CO., LTD., Seoul (KR)

(72) Inventor: In Seon Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 126 days.

(21) Appl. No.: 15/982,492

(22) Filed: May 17, 2018

(65) Prior Publication Data

US 2018/0351920 A1 Dec. 6, 2018

(30) Foreign Application Priority Data

May 31, 2017 (KR) .......................... 10-2017-0067575

(51) Int. Cl.
| | | |
|---|---|---|
| H04L 29/06 | (2006.01) | |
| H04L 9/40 | (2022.01) | |
| H04L 69/22 | (2022.01) | |
| H04L 69/04 | (2022.01) | |
| H04L 9/32 | (2006.01) | |
| H04L 9/08 | (2006.01) | |

(52) U.S. Cl.
CPC ........ *H04L 63/0428* (2013.01); *H04L 9/0822* (2013.01); *H04L 9/3236* (2013.01); *H04L 9/3239* (2013.01); *H04L 63/062* (2013.01); *H04L 69/04* (2013.01); *H04L 69/22* (2013.01); *H04L 2209/30* (2013.01)

(58) Field of Classification Search
CPC ... H04L 9/0822; H04L 9/3236; H04L 9/3239; H04L 63/0428; H04L 63/062; H04L 69/04; H04L 69/22; H04L 2209/30
See application file for complete search history.

(56) References Cited

U.S. PATENT DOCUMENTS

| | | | | |
|---|---|---|---|---|
| 7,814,316 | B1 * | 10/2010 | Hughes | G06F 21/72 |
| | | | | 713/160 |
| 8,832,043 | B2 * | 9/2014 | Koifman | G06F 3/0631 |
| | | | | 707/693 |
| 9,792,308 | B2 * | 10/2017 | Fallon | H03M 7/4043 |
| 2002/0169971 | A1 * | 11/2002 | Asano | H04L 9/3273 |
| | | | | 713/193 |
| 2007/0192376 | A1 * | 8/2007 | Bentley | G06F 16/10 |

(Continued)

FOREIGN PATENT DOCUMENTS

| | | |
|---|---|---|
| JP | 2006-345036 A | 12/2006 |
| JP | 2015-114771 A | 6/2015 |

(Continued)

OTHER PUBLICATIONS

Communication dated Nov. 28, 2018, issued by the Korean Intellectual Property Office in counterpart Korean Application No. 10-2017-0067575.

*Primary Examiner* — Gary S Gracia
*Assistant Examiner* — Rodman Alexander Mahmoudi
(74) *Attorney, Agent, or Firm* — Sughrue Mion, PLLC

(57) ABSTRACT

There is provided an encryption processing method performed by an encryption processing apparatus. The encryption processing method comprises compressing data to obtain compressed data, determining, within the compressed data, a section to be encrypted and encrypting the section to obtain partially encrypted data.

11 Claims, 12 Drawing Sheets

(56) References Cited

U.S. PATENT DOCUMENTS

| | | | |
|---|---|---|---|
| 2009/0190760 A1* | 7/2009 | Bojinov | G06F 3/0676 |
| | | | 380/269 |
| 2017/0019385 A1 | 1/2017 | Yoo | |
| 2017/0078609 A1* | 3/2017 | Kim | H04N 19/124 |
| 2017/0264432 A1* | 9/2017 | Horowitz | H04L 9/0822 |
| 2017/0286319 A1* | 10/2017 | Abbas | G06F 3/0623 |
| 2019/0278525 A1* | 9/2019 | Chhabra | G06F 12/145 |

FOREIGN PATENT DOCUMENTS

| | | |
|---|---|---|
| KR | 101047213 B1 | 7/2011 |
| KR | 10-2011-0119269 A | 11/2011 |
| KR | 10-2016-0139493 A | 12/2016 |

* cited by examiner

FIG. 9B

| COMMON HEADER (541) | ENCRYPTION HEADER #1 (543) | | | ENCRYPTION HEADER #2 (545) | | | ... |
|---|---|---|---|---|---|---|---|
| SIZE OF ORIGINAL DATA | TYPE OF ENCRYPTION ALGORITHM | KEY HASH | SIZE OF ENCRYPTED DATA | TYPE OF ENCRYPTION ALGORITHM | KEY HASH | SIZE OF ENCRYPTED DATA | ... |

540

ENCRYPTION PROCESSING METHOD AND APPARATUS

CROSS-REFERENCE TO RELATED APPLICATION

This application claims the benefit of Korean Patent Application No. 10-2017-0067575, filed on May 31, 2017, in the Korean Intellectual Property Office, the disclosure of which is incorporated herein by reference in its entirety.

BACKGROUND

1. Field

The present disclosure relates to an encryption processing method and apparatus, and more particularly, to a method of improving both user-perceived performance and data security by providing high-speed encryption processing for large data and an apparatus for performing the method.

2. Description of the Related Art

Encryption processing using an encryption algorithm is usually performed to safely keep sensitive personal information and various data stored in a server. For example, encryption processing performed using an encryption algorithm such as 3-DES, AES128, AES256, etc. can ensure the security of data as long as the security of an encryption key is ensured.

An issue that should be considered together with data security is performance. This is because encryption processing for data security involves performing encryption/decryption whenever data is stored or retrieved, and not a small computing cost is required to perform the encryption/decryption. In particular, in the case of a system requiring immediate processing such as an email system, encryption/decryption processing performance is directly related to user-perceived performance. Therefore, the encryption/decryption processing performance is an important factor that determines user satisfaction with the system.

However, since the speed of encryption/decryption decreases as data size increases, it is difficult to guarantee the encryption/decryption processing performance for large data. This is true even when a high-speed encryption algorithm is used.

In order to solve the above problem, a compression processing method may be used instead of the encryption processing method. However, the compression processing method fails to provide more than a certain level of data security although it requires less computing cost than the encryption processing method.

To improve data security, a predetermined password may be assigned to compressed data. However, since most compression algorithms such as winzip and 7-zip keep passwords in compressed data, more than a certain level of data security cannot still be guaranteed. In addition, since user intervention is essential to assign a password, this method significantly reduces user convenience.

Therefore, there is a need for an encryption/decryption method that provides high-speed encryption/decryption processing for large data without requiring user intervention and an apparatus for performing the encryption/decryption method.

SUMMARY

Aspects of the present disclosure provide an encryption processing method and apparatus which provide high-speed encryption processing for large data.

Aspects of the present disclosure also provide an encryption processing method and apparatus which can provide both high-speed encryption processing and more than a certain level of data security.

Aspects of the present disclosure also provide a decryption processing method and apparatus which provide high-speed decryption processing for large data.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided an encryption processing method performed by an encryption processing apparatus, the encryption processing method comprising performing compression processing on data to be encrypted and obtaining compressed data for the data to be encrypted as a result of performing the compression processing, determining a section to be encrypted in the compressed data and performing encryption processing on the section to be encrypted and obtaining partially encrypted data for the compressed data as a result of performing the encryption processing, wherein the section to be encrypted is a part of the compressed data.

According to another aspect of the present disclosure, there is provided an encryption processing apparatus comprising a hardware processor, a memory configured to load a computer program to be executed by the hardware processor and a storage configured to store the computer program, wherein the computer program, when executed by the hardware processor, causes the hardware processor to perform operations comprising compressing data to obtain compressed data, determining, within the compressed data, a section to be encrypted and encrypting the section to obtain partially encrypted data.

According to another aspect of the present disclosure, there is provided a non-transitory computer-readable storage medium storing a computer program which, when executed by a processor of a computing apparatus, causes the processor to perform compressing data to obtain compressed data, determining, within the compressed data, a section to be encrypted and encrypting the section to obtain partially encrypted data.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, preferred embodiments of the present disclosure will be described with reference to the attached drawings. Advantages and features of the present disclosure and methods of accomplishing the same may be understood readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, embodiments of the present disclosure will be described in detail with reference to the accompanying drawings.

Figure 1:
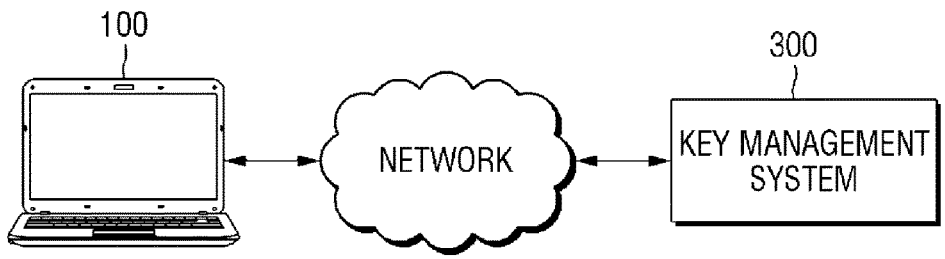
FIG. 1 illustrates the configuration of an encryption processing system according to an embodiment.

FIG. 1 illustrates the configuration of an encryption processing system according to an embodiment.

Referring to FIG. 1, the encryption processing system may include an encryption processing apparatus 100 and a key management system 300. However, this is merely an embodiment for achieving the objectives of the present disclosure, and some components can be added or removed if necessary. In addition, it should be noted that the components of the encryption processing system illustrated in FIG. 1 are functionally distinct components and that one or more components can be integrated with each other in an actual physical environment. Each component of the encryption processing system will now be described.

The encryption processing apparatus 100 is a computing apparatus that provides encryption processing for large data to be encrypted. However, depending on embodiments, the encryption processing apparatus 100 may also provide a decryption processing function which will be described later.

The computing apparatus may be a notebook computer, a desktop computer, a laptop computer, or the like. However, the computing apparatus is not limited to these examples and can be any kind of device having a computing unit and a communication unit.

In the current embodiment, the encryption processing apparatus 100 may obtain an encryption key from the external key management system 300 and perform encryption processing on data to be encrypted. Here, the encryption key is stored neither in encrypted data nor in the encryption processing apparatus 100. Therefore, according to the current embodiment, the security of the data to be encrypted can be ensured unless the encryption key is leaked from the key management system 300.

In the current embodiment, the encryption processing apparatus 100 may reduce the size of data through compression processing and perform encryption processing only on a part of the compressed data. Therefore, the encryption processing apparatus 100 can perform high-speed encryption processing even on large data to be encrypted. In addition, since core data such as a compression header is determined as a section to be encrypted, the security of data to be encrypted can also be ensured.

The algorithm used for the above encryption processing and the above compression processing may be at least one algorithm well known in the art, and the type of algorithm to which the scope of the present disclosure is applied is not limited. A detailed description of how the encryption processing apparatus 100 performs encryption processing will be given later with reference to FIGS. 5A through 10.

The key management system 300 is a system that provides an encryption key used in encryption processing in response to a request from the encryption processing apparatus 100. The key management system 300 may be composed of a single computing apparatus or may be composed of a plurality of computing apparatuses. The key management system 300 will be described in detail later with reference to FIG. 2.

In the current embodiment, the encryption processing apparatus 100 and the key management system 300 may communicate over a network. In the communication process, communication encryption processing may be performed using a technique such as IPSec or Secure Socket Layer (SSL). A description of the technique will be omitted in order not to obscure the point of the present disclosure.

The network may be implemented as any kind of wired/wireless network such as a local area network (LAN), a wide area network (WAN), a mobile radio communication network, or a wireless broadband Internet (Wibro).

Until now, the encryption processing system according to the embodiment has been described with reference to FIG. 1. Each component of the encryption processing system will now be described in more detail with reference to FIGS. 2 through 4.

For ease of understanding, the configuration of the key management system 300 will be briefly described with reference to FIG. 2, and then the encryption processing apparatus 100 will be described.

Figure 2:
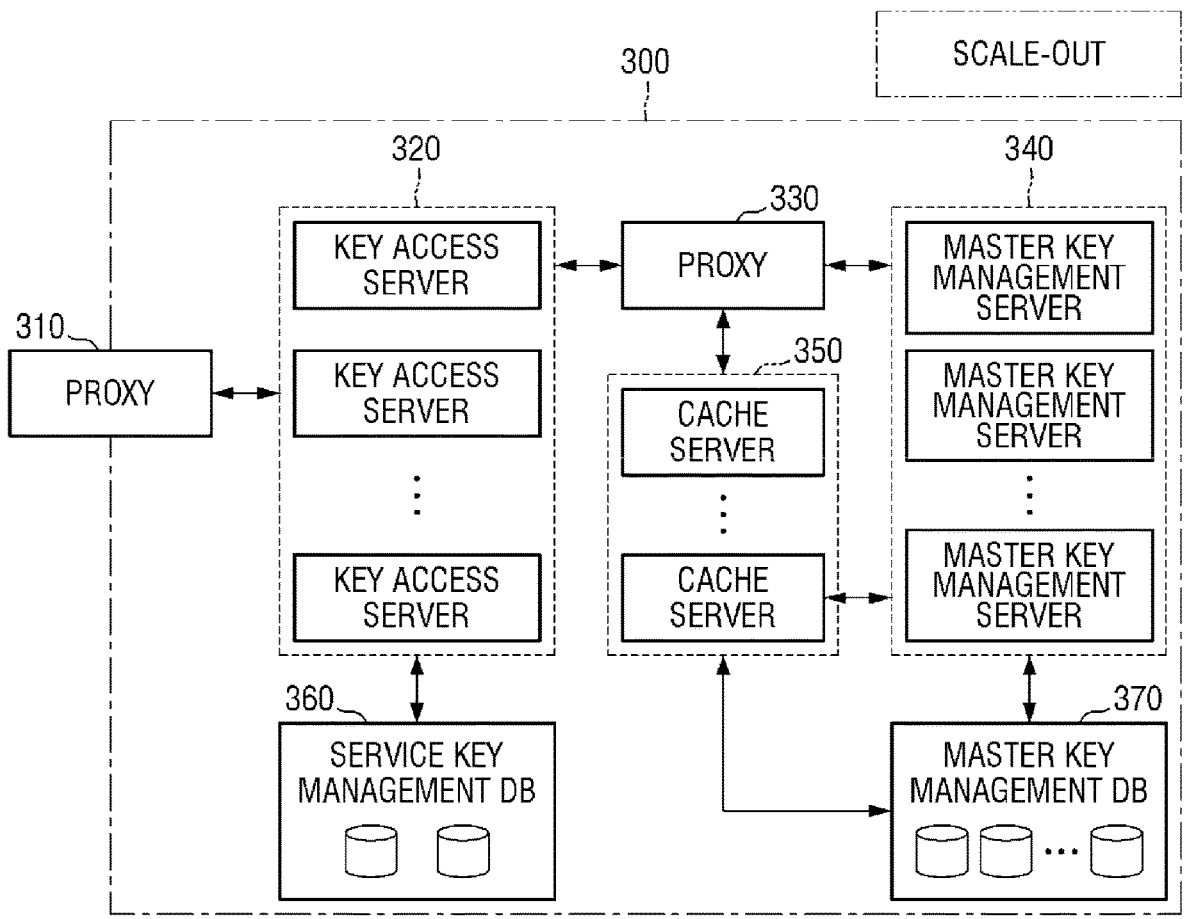
FIG. 2 is a block diagram of a key management system which is a component of the encryption processing system.

Referring to FIG. 2, the key management system 300 includes a key access server 320, a master key management server 340, a cache server 350, a service key management database (DB) 360, and a master key management DB 370. Here, a service key refers to an encryption key or a decryption key provided to the encryption processing apparatus 100 or a decryption processing apparatus 200 to be described later, and a master key refers to a key used to encrypt and decrypt the service key.

The key access server 320 receives a request from the encryption processing apparatus 100 and provides an encryption key to the encryption processing apparatus 100 in response to the request.

According to an embodiment, the key access server 320 may be composed of a plurality of servers having a scale-out structure. In this case, the key management system 300 may include a proxy 310 for forwarding an encryption key request to the scaled-out servers.

Depending on embodiments, the proxy 310 may distribute a received encryption key request in consideration of the state of each key access server 320. Here, examples of the state may include, but are not limited to, the failure or non-failure, load, and processing performance of each key access server 320.

The master key management server 340 generates or reconstructs a master key in response to a request from the key access server 320 and provides the master key. The master key management server 340 may also have the scale-out structure. In this case, the key management system 300 may include a proxy 330 for forwarding a request from the key access server 320 to the master key server 340.

Depending on embodiments, the proxy 330 may also distribute a received master key request in consideration of the state of each master key management server 340. Here, examples of the state may include, but are not limited to, the failure or non-failure, load, and processing performance of each master key management server 340.

According to an embodiment, the master key management server 340 may divide a master key into a plurality of key pieces using a predetermined algorithm and then store the key pieces in the master key management DB 370 in a distributed manner. That is, the master key is not stored as it is in the master key management DB 370. Instead, the master key is stored in the master key management DB 370 in the form of a plurality of distributed master key pieces. In addition, the master key management server 340 may reconstruct the master key using a predetermined number or more of key pieces from among the master key pieces. For example, the master key may be reconstructed using Lagrange interpolation and secret sharing having a threshold (e.g., threshold secret sharing). According to the current embodiment, even if key pieces are leaked out, if the number of the leaked key pieces is less than the predetermined number, the master key cannot be reconstructed. Thus, the security of key management can be improved. In addition, since the master key is not stored as it is in any device within the key management system 300, the confidentiality of the master key can also be ensured.

The cache server 350 may encrypt and store frequently used master keys. In particular, if the master key management DB 370 is implemented as a relational DB, it may be accessed many times to store and reconstruct master keys. This may be somewhat inefficient in terms of performance. In this case, frequently used master keys may be stored in the cache server 350 to improve the overall performance of the key management system 300. Depending on embodiments, the cache server 350 may be implemented as a distributed cache configured in a scale-out structure.

The service key management DB 360 stores a service key encrypted using a master key and identification information of the master key. Therefore, the key access server 320 may request the master key management server 340 to reconstruct the master key using the identification information of the master key, decrypt the encrypted service key using the received master key, and then safely provide the service key to the encryption processing apparatus 100 or the decryption processing apparatus 200.

Until now, the configuration of the key management system 300, which is a component of the encryption processing system, has been briefly described with reference to FIG. 2. According to the above description, the key management system 300 allocates a service key management function and a master key management function to different servers, encrypts and stores a service key, and stores a master key divided into a plurality of key pieces. Therefore, secure key management can be provided. In addition, since a plurality of components are configured in a scale-out structure, not only the processing performance of the key management system 300 is improved, but also a single point of failure (SPOF) problem is solved, thereby improving system-wide availability and reliability.

The configuration and operation of the encryption processing apparatus 100 will now be described with reference to FIGS. 3 and 4.

Figure 3:
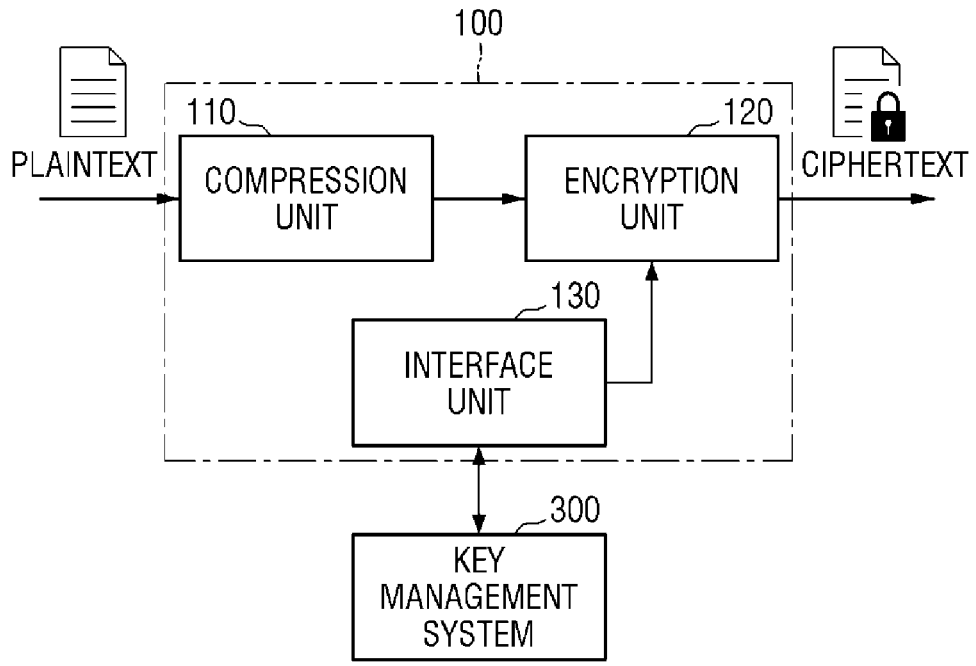
FIG. 3 is a block diagram of an encryption processing apparatus according to an embodiment.

FIG. 3 is a block diagram of an encryption processing apparatus 100 according to an embodiment.

Referring to FIG. 3, the encryption processing apparatus 100 may include a compression unit 110, an encryption unit 120, and an interface unit 130. In FIG. 3, components only related to the embodiment are illustrated. Therefore, it will be understood by those of ordinary skill in the art to which the present disclosure pertains that other general-purpose components can be included in addition to the components illustrated in FIG. 3. In addition, it should be noted that the components of the encryption processing apparatus 100 illustrated in FIG. 3 are functionally distinct components and that one or more components can be integrated with each other in an actual physical environment. Each component of the encryption processing apparatus 100 will now be described.

The compression unit 110 performs compression processing on data to be encrypted, which is composed of plaintext, and provides compressed data obtained as a result of performing the compression processing on the data to be encrypted. The compression processing will be described in detail later with reference to FIGS. 5A through 10.

The encryption unit 120 receives an encryption key from the interface unit 130 and performs encryption processing on the compressed data using the encryption key. The encryption processing may be performed on only a part of the compressed data, and the part may be, for example, a compression header indicating metadata about the compression processing. The encryption processing will be described in detail later with reference to FIGS. 5A through 10.

The interface unit 130 is linked with the external key management system 300. Thus, the interface unit 130 requests the key management system 300 to provide an encryption key, receives the encryption key, and transmits the encryption key to the encryption unit 120.

Each component of FIG. 3 may be, but is not limited to, a software component or a hardware component such as a Field Programmable Gate Array (FPGA) or Application Specific Integrated Circuit (ASIC). A component may advantageously be configured to reside on the addressable storage medium and configured to execute on one or more processors. The functionality provided for in the components may be further separated into additional components or combined into a single component that performs certain functions.

Figure 4:
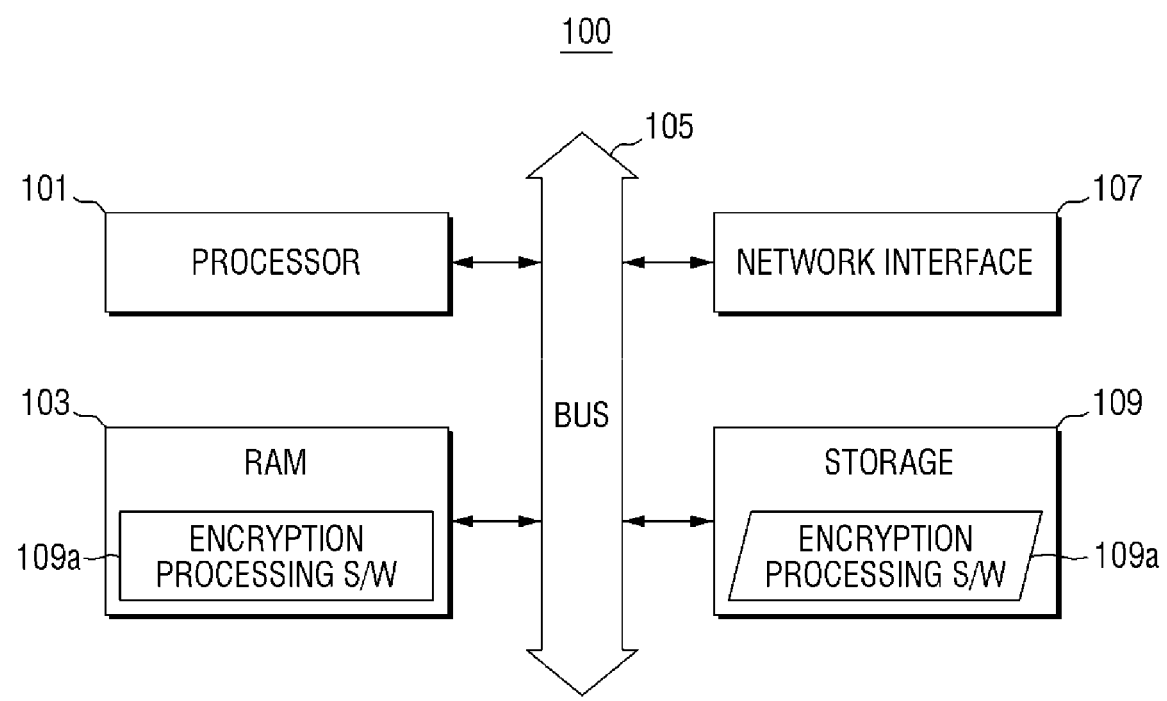
FIG. 4 illustrates the hardware configuration of the encryption processing apparatus according to an embodiment.

FIG. 4 illustrates the hardware configuration of the encryption processing apparatus 100 according to an embodiment.

Referring to FIG. 4, the encryption processing apparatus 100 may include one or more processors 101, a bus 105, a network interface 107, a memory 103 which loads a computer program to be executed by the processors 101, and a storage 109 which stores encryption processing software 109a. In FIG. 4, components only related to the embodiment are illustrated. Therefore, it will be understood by those of ordinary skill in the art to which the present disclosure pertains that other general-purpose components can be included in addition to the components illustrated in FIG. 4.

The processors 101 control the overall operation of each component of the encryption processing apparatus 100. The processors 101 may include a central processing unit (CPU), a micro-processor unit (MPU), a micro-controller unit (MCU), a graphic processing unit (GPU), or any form of processor well known in the art to which the present disclosure pertains. In addition, the processors 101 may perform an operation on at least one application or program for executing a method according to embodiments. The encryption processing apparatus 100 may include one or more processors.

The memory 103 stores various data, commands and/or information. The memory 103 may load one or more programs 109a from the storage 109 to execute an encryption processing method according to embodiments. In FIG. 4, a random access memory (RAM) is illustrated as an example of the memory 103.

The bus 105 provides a communication function between the components of the encryption processing apparatus 100. The bus 105 may be implemented as various forms of buses such as an address bus, a data bus and a control bus.

The network interface 107 supports wired and wireless Internet communication of the encryption processing apparatus 100. In addition, the network interface 107 may support various communication methods as well as Internet communication. To this end, the network interface 107 may include various communication modules well known in the art to which the present disclosure pertains.

Specifically, the network interface 170 may transmit an encryption key request to the key management system 300 and receive an encryption key from the key management system 300.

The storage 109 may non-temporarily store the programs 109a. In FIG. 4, the encryption processing software 109a is illustrated as an example of the programs 109a.

The storage 109 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The encryption processing software 109a may perform an encryption processing method according to an embodiment in order to perform encryption processing on large data to be encrypted according to an embodiment.

Specifically, the encryption processing software 109a may be loaded into the memory 103 and executed by the processors 101 to carry out an operation of performing compression processing on data to be encrypted and obtaining compressed data for the data to be encrypted as a result of performing the compression processing, an operation of determining a section to be encrypted in the compressed data, and an operation of performing encryption processing on the section to be encrypted and obtaining partially encrypted data for the compressed data as a result of performing the encryption processing, wherein the section to be encrypted is a part of the compressed data.

Until now, the configuration and operation of the encryption processing apparatus 100 according to the embodiment have been described with reference to FIGS. 3 and 4.

Encryption processing methods according to embodiments will now be described in detail with reference to FIGS. 5A through 10. Each operation included in each of the encryption processing methods according to the embodiments may be performed by a computing apparatus. The computing apparatus may be, for example, the encryption processing apparatus 100. However, the subject of each operation included in each of the encryption processing methods may be omitted for ease of description. In addition, each operation included in each of the encryption processing methods may be an operation performed by the encryption processing apparatus 100 as the encryption processing software 109a is executed by the processors 101.

Figure 5A:
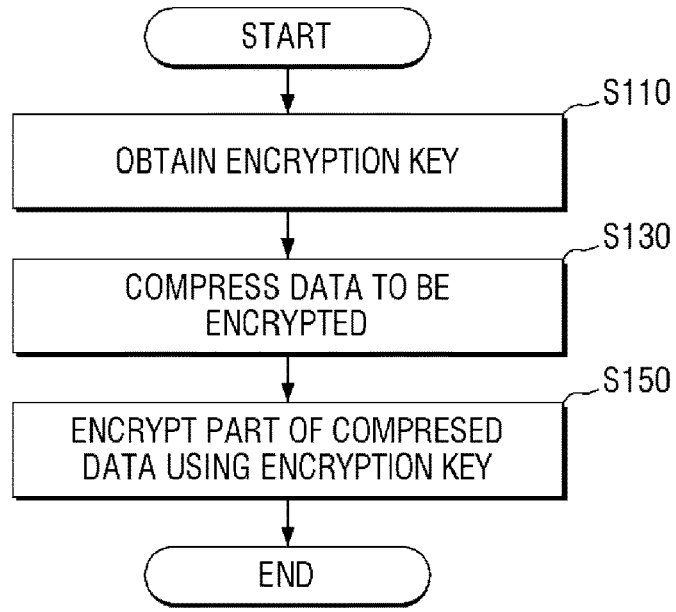
FIGS. 5A through 6 are diagrams illustrating encryption processing methods according to embodiments.

FIG. 5A is a flowchart illustrating an encryption processing method. However, this is merely an embodiment for achieving the objectives of the present disclosure, and some operations can be added or removed if necessary.

Referring to FIG. 5A, in operation S110, the encryption processing apparatus 100 obtains an encryption key to perform encryption processing on data to be encrypted. It should be noted that operation S110 can be performed at the same time as operation S130 or after operation S130.

Figure 5B:
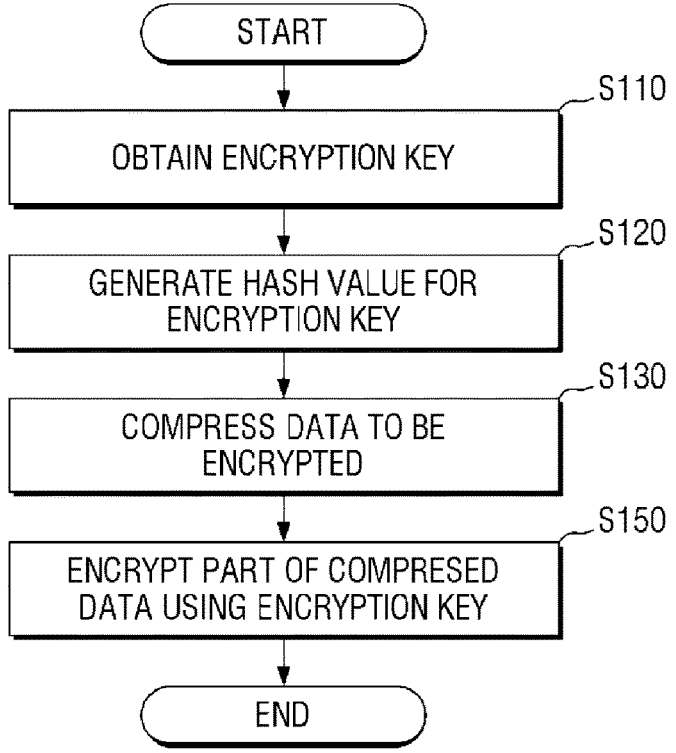
Figure 6:
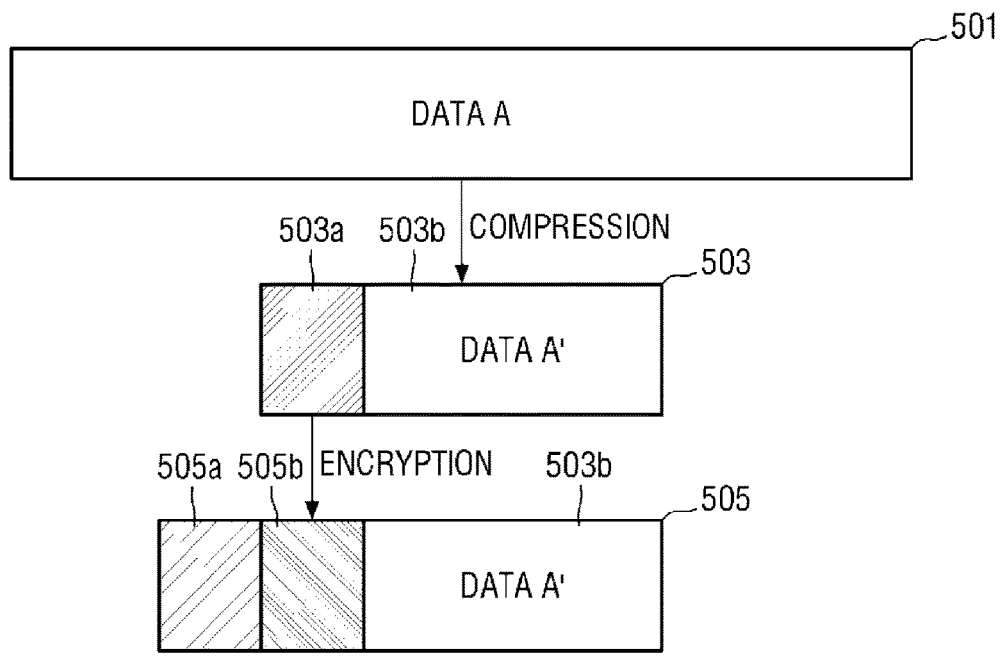

As illustrated in FIG. 5B, after operation S110, the encryption processing apparatus 100 may further generate a hash value for the encryption key and store the hash value in an encryption header indicating metadata about encryption processing in operation S120. The hash value may be used for key verification in a subsequent decryption operation. A description related to the hash value can be found in the description of FIGS. 7 and 12.

In an embodiment, the encryption key may be obtained from the external key management system 300. According to the current embodiment, the encryption key is not stored in the encryption processing apparatus 100. Therefore, data security can be further increased.

According to an embodiment, the encryption key may be generated by the encryption processing apparatus 100 or may be retrieved from the encryption processing apparatus 100. As long as encrypted data is stored in an external storage without being stored in the encryption processing apparatus 100, a certain level of data security can be ensured even according to the current embodiment.

Next, in operation S130, the encryption processing apparatus 100 performs compression processing on the data to be encrypted and obtains compressed data for the data to be encrypted as a result of performing the compression processing. The compression processing may be performed using a compression algorithm well known in the art, such as LZO, Snappy, SynLZ, LZ4, or QuickLZ.

The compressed data may include a compression header indicating metadata related to the compression processing. For example, referring to FIG. 6, when data A (501) is data to be encrypted, compressed data 503 obtained through compression processing may include a compression header 503a and data A' (503b) which is a compressed version of data A (501). For reference, each piece of metadata included in the compression header 503a may vary according to a compression algorithm.

According to an embodiment, the compression processing may be performed on all or part of the data to be encrypted.

For example, the range of data to be compressed may vary according to the type of data to be encrypted. More specifically, if the type of data to be encrypted is a file such as a "txt" file that does not include structured metadata, the compression processing may be performed on all of the data. If the type of the data to be encrypted is a file such as a "jpg" file that indicates metadata, the compression processing may be performed only on the metadata area.

In addition, depending on embodiments, when the size of the data to be encrypted is smaller than or equal to a preset size, the compression processing operation (S130) may be omitted.

After the compression processing, the encryption processing apparatus 100 determines a section to be encrypted in the compressed data and obtains partially encrypted data for the compressed data by performing encryption processing on the section to be encrypted in operation S150. Here, the partially encrypted data literally refers to data that has been only partially encrypted.

The partially encrypted data may include an encryption header indicating metadata related to the encryption processing. For example, referring to FIG. 6, partially encrypted data 505 obtained by performing encryption processing on the compressed data 503 includes an encryption header 505a, encrypted data 505b, and unencrypted data 503b.

In an embodiment, the section to be encrypted may be determined to be a section corresponding to the compression header. For example, referring to FIG. 6, the section to be encrypted may be determined to be a section corresponding to the compression header 503a. This is because it is impossible to decompress the compressed data 503b if the compression header 503a is encrypted, and thus the security of the entire data A (501) can be ensured. According to the current embodiment, since only relatively small metadata is encrypted, high-speed encryption processing can be performed, and the security of the entire data can be ensured.

According to an embodiment, the size of the section to be encrypted may vary according to the size of the compressed data, the type of encryption algorithm, etc. For example, the smaller the size of the compressed data, the larger the size of the section to be encrypted. For another example, since the speed of encryption processing varies according to the type of encryption algorithm, the size of the data to be encrypted may be increased when a high-speed encryption algorithm is used.

Until now, the encryption processing methods according to the embodiments have been described with reference to FIGS. 5A and 5B. According to the current embodiments, the size of data to be encrypted may be reduced through compression processing, and encryption may be performed only on a part of the compressed data. Therefore, high-speed encryption processing can be provided even for large data.

The structures of partially encrypted data that can be obtained by performing encryption processing methods according to embodiments will now be described with reference to FIGS. 7 through 9B.

Figure 7:
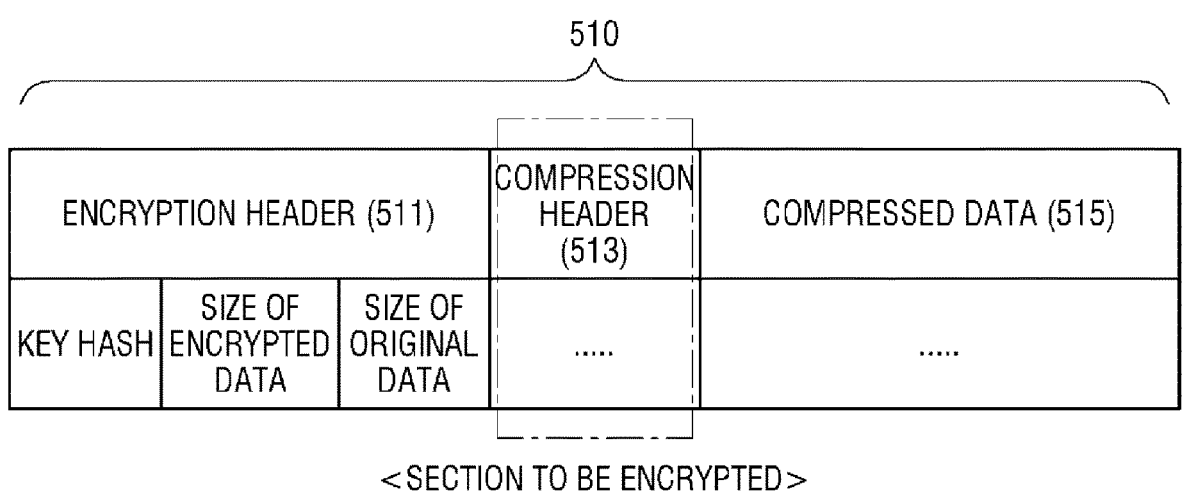
FIGS. 7 through 9B illustrate the structures of partially encrypted data according to embodiments.

FIG. 7 illustrates the structure of partially encrypted data 510 according to a first embodiment.

Referring to FIG. 7, the partially encrypted data 510 includes an encryption header 511, a compression header 513, and compressed data 515. Here, the encryption header 511 may include a hash value of an encryption key, the size of data encrypted by encryption processing, and the size of data to be encrypted which is original data.

That is, according to the first embodiment, the encryption processing apparatus 100 may generate a hash value of an encryption key as illustrated in FIG. 5B, store the hash value in the encryption header 511, and store information about the size of data to be encrypted and the size of data encrypted by encryption processing in the encryption header 511.

Each piece of metadata stored in the encryption header 511 may be used to perform decryption processing on the partially encrypted data 510. For example, the size of encrypted data may be used to determine a section to be decrypted. In the first embodiment, only the size of encrypted data is stored in the encryption header 511 based on the assumption that the compression header 513 is located adjacent to the encryption header 511 and determined as a section to be encrypted. However, since a change in the location of the section to be encrypted results in a change in the location of the section to be decrypted, metadata indicating the location (e.g., offset) of encrypted data may also be included in the encryption header 511.

Figure 8:
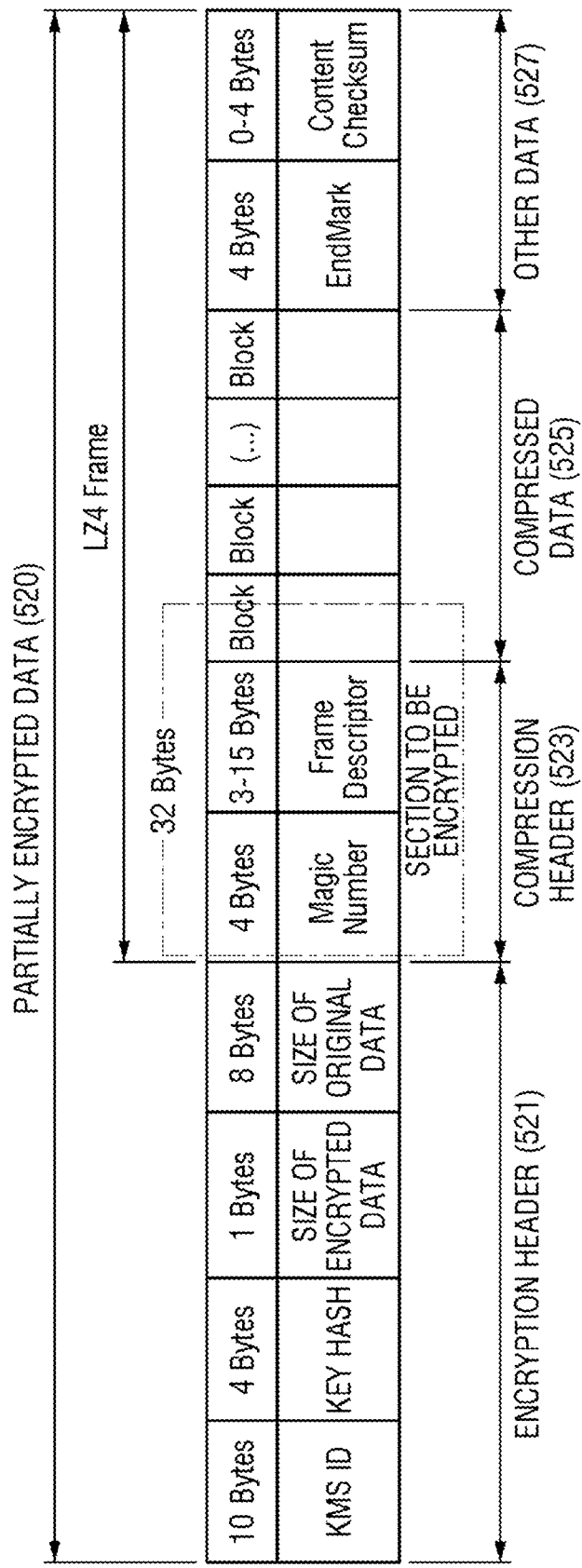

For ease of understanding, the structure of partially encrypted data according to an implementation example will now be briefly described with reference to FIG. 8. FIG. 8 illustrates an example in which an LZ algorithm is used for compression processing.

Referring to FIG. 8, a compression header 523 generated according to the LZ algorithm includes a magic number and a frame descriptor. However, as described above, the type and number of pieces of metadata included in a compression header may vary according to a compression algorithm.

For reference, when a block cipher-based encryption algorithm is used, if the size of the compression header is smaller than a block size or is not a multiple of the block size, a section to be encrypted may be set to include a part of compressed data as illustrated in FIG. 8. Depending on embodiments, the compression header and zero-padded data may be set as the section to be encrypted.

In addition, an encryption header 521 of partially encrypted data 520 may further include a KMS ID. The KMS ID is an identifier of a key management system and may be used to identify the key management system when obtaining a decryption key.

The structure of partially encrypted data according to a second embodiment will now be described with reference to FIG. 9A.

Figure 9A:
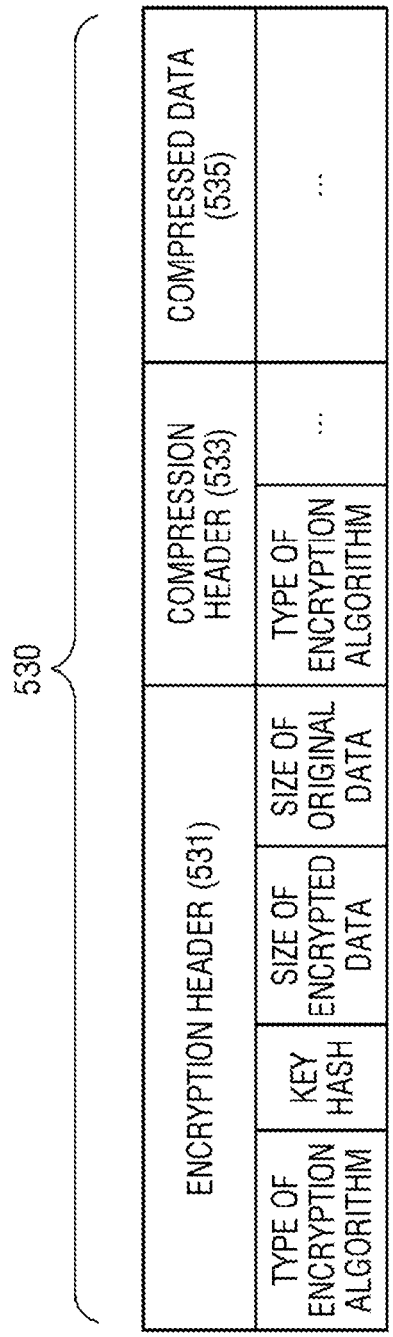

Referring to FIG. 9A, a compression header 533 may further include first identification data indicating the type of a compression algorithm, and an encryption header 531 may further include second identification data indicating the type of an encryption algorithm.

In the second embodiment, the encryption processing apparatus 100 may select any one of a plurality of compression algorithms and perform compression processing using the selected algorithm. In addition, the first identification data indicating the selected algorithm may be stored in the compression header 533. The first identification data included in the compression header 533 may be used to determine a decompression algorithm in a subsequent decryption processing process.

In the second embodiment, the encryption processing apparatus 100 may select any one of a plurality of encryption algorithms and perform encryption processing using the selected algorithm. In addition, the second identification data indicating the selected algorithm may be stored in the encryption header 531. The second identification data included in the encryption header 531 may be used to determine a decryption algorithm in the subsequent decryption processing process.

According to the second embodiment, different compression algorithms and/or different encryption algorithms may be used for at least some of the data to be encrypted. Therefore, data security can be further increased.

The structure of partially encrypted data according to a third embodiment will now be described with reference to FIG. 9B.

Referring to FIG. 9B, partially encrypted data 540 includes a common header 541 and a plurality of encryption headers 543 and 545. Although not illustrated in FIG. 9B, the partially encrypted data 540 may also include a plurality of compression headers.

In the third embodiment, the encryption processing apparatus 100 may divide data to be encrypted into a plurality of pieces of partial data and perform compression processing using different compression algorithms for at least some of the pieces of partial data. In this case, a plurality of compression headers are generated.

In the third embodiment, the encryption processing apparatus 100 may select a plurality of sections to be encrypted (e.g., a plurality of compression headers) and perform encryption processing using different encryption keys and/or different encryption algorithms for at least some of the sections to be encrypted.

Alternatively, the encryption processing apparatus 100 may divide a single section to be encrypted into a plurality of sections and then perform encryption processing using different encryption keys and/or different encryption algorithms for at least some of the sections.

According to the third embodiment, since different compression algorithms and/or different encryption algorithms can be used for at least some parts of the data to be encrypted, data security can be further increased.

Until now, the structures of partially encrypted data according to the embodiments have been described with reference to FIGS. 7 through 9B. An encryption processing method for improving encryption processing performance according to an embodiment will now be described with reference to FIG. 10.

Figure 10:
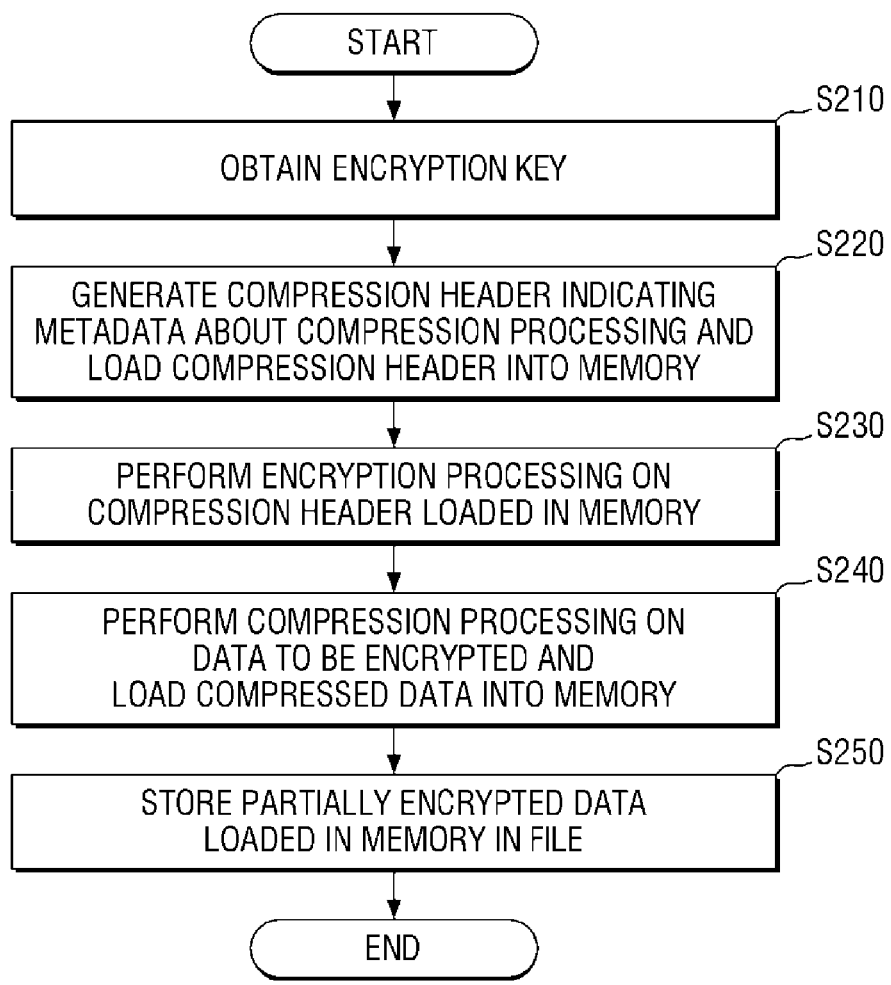
FIG. 10 is a flowchart illustrating an encryption processing method capable of improving encryption processing performance according to an embodiment.

The encryption processing methods described so far are based on the assumption that encryption processing is performed after compression processing. In this case, after compressed data is stored in a file through compression processing, it should be loaded again from the file into a memory for encryption processing. This may be inefficient. In addition, the performance of encryption processing on large data may deteriorate due to frequent file input/output. Therefore, according to an embodiment, as illustrated in FIG. 10, when a compression header is loaded into the memory before actual data compression is performed, encryption processing may be immediately performed on the compression header before completing the actual data compressing.

More specifically, before performing data compression on data to be encrypted, the encryption processing apparatus 100 may generate a compression header and load the compression header into a memory in operation S220 and immediately perform encryption processing on the compression header loaded in the memory in operation S230. Then, the encryption processing apparatus 100 may compress the data to be encrypted and load the compressed data into the memory in operation S240 and store the encrypted compression header, the compressed data and the encryption header in a file in operation S250. For reference, in the current embodiment, operation S230 may be performed in parallel with compression operation S240.

According to the current embodiment, since data loaded in the memory is immediately encrypted in the compression processing process, the number of file input/output operations can be minimized, and the overall encryption processing performance can be improved.

The current embodiment has been described based on the assumption that a section to be encrypted is a compression header. However, even when the section to be encrypted is a part other than the compression header, the above-described technical idea may apply equally. For example, when first partial data of data to be encrypted which corresponds to the section to be encrypted is compressed and loaded into the memory, the compressed first partial data loaded in the memory may be encrypted. Then, second partial data of the data to be encrypted may be compressed in the memory.

Until now, the encryption processing methods according to the embodiments have been described with reference to FIGS. 5A through 10. A decryption processing apparatus 200 and a decryption processing method according to an embodiment will now be described with reference to FIGS. 11 and 12.

Figure 11:
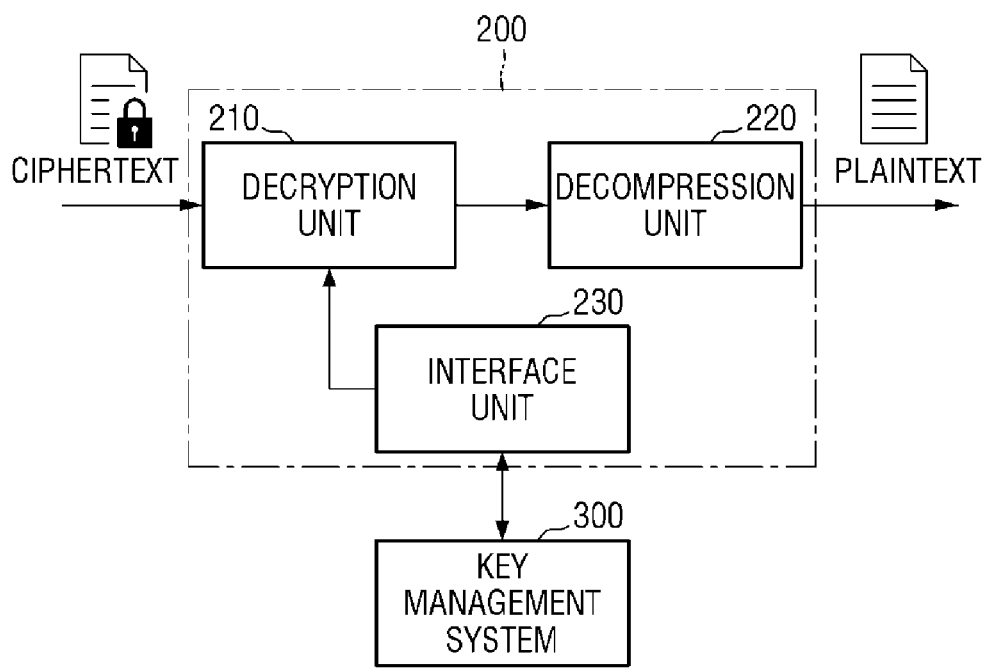
FIG. 11 is a block diagram of a decryption processing apparatus according to an embodiment.

FIG. 11 is a block diagram of a decryption processing apparatus 200 according to an embodiment.

Referring to FIG. 11, the decryption processing apparatus 200 may include a decryption unit 210, a decompression unit 220, and an interface unit 230. In FIG. 11, components only related to the embodiment are illustrated. Therefore, it will be understood by those of ordinary skill in the art to which the present disclosure pertains that other general-purpose components can be included in addition to the components illustrated in FIG. 11. In addition, it should be noted that the components of the decryption processing apparatus 200 illustrated in FIG. 11 are functionally distinct components and that one or more components can be integrated with each other in an actual physical environment. Each component of the decryption processing apparatus 200 will now be described.

The decryption unit 210 receives a decryption key from the interface unit 230, performs decryption processing on partially encrypted data, which is partially composed of ciphertext, using the decryption key, and provides the decrypted data. According to an embodiment, a compression header may be decrypted as a result of the decryption processing. The decryption processing will be described in detail later with reference to FIG. 12.

The decompression unit 220 performs decompression processing on compressed data using a compression header and provides the decompressed data. The decompression processing will be described in detail later with reference to FIG. 12.

The interface unit 230 is linked with the external key management system 300. Thus, the interface unit 230 requests the key management system 300 to provide a decryption key, receives the decryption key, and transmits the decryption key to the decryption unit 210.

Each component of FIG. 11 may be, but is not limited to, a software component or a hardware component such as an FPGA or ASIC. A component may advantageously be configured to reside on the addressable storage medium and configured to execute on one or more processors. The functionality provided for in the components may be further separated into additional components or combined into a single component that performs certain functions.

A decryption processing method according to an embodiment will now be described with reference to FIG. 12.

The decryption processing method may be performed by, for example, the decryption processing apparatus 200. However, the subject of each operation included in the decryption processing method may be omitted for ease of description.

In addition, each operation included in the decryption processing method may be an operation performed by the decryption processing apparatus 200 as decryption processing software is executed by a processor. The hardware configuration of the decryption processing apparatus 200 is substantially the same as that of the encryption processing apparatus 100. Thus, FIG. 4 can be referred to for the hardware configuration of the decryption processing apparatus 200.

Figure 12:
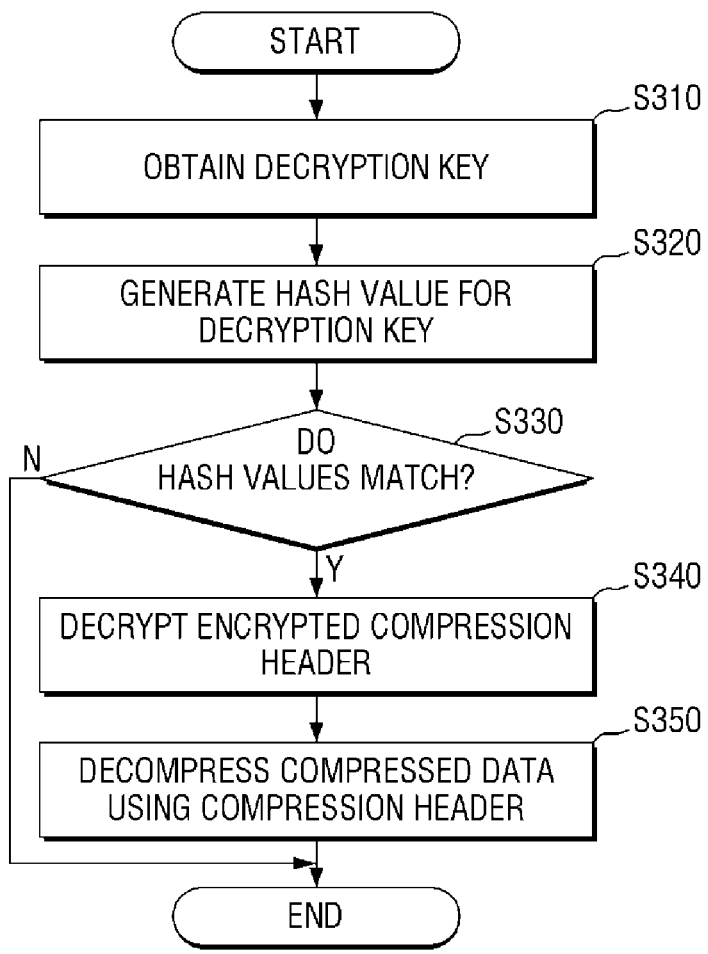
FIG. 12 is a flowchart illustrating a decryption processing method according to an embodiment.

FIG. 12 is a flowchart illustrating a decryption processing method. However, this is merely an embodiment for achieving the objectives of the present disclosure, and some operations can be added or removed if necessary. In FIG. 12, it is assumed that a section to be encrypted is a compression header.

Referring to FIG. 12, in operation S310, the decryption processing apparatus 200 obtains a decryption key used to perform decryption processing on partially encrypted data. A detailed description of operation S310 can be found in the description of operation S110.

Next, the decryption processing apparatus 200 generates a hash value for the decryption key in operation S320 and checks whether the hash value matches a hash value included in an encryption header in operation S330. If the hash values do not match, the decryption processing apparatus 200 may terminate the decryption processing process without performing further processing.

If the hash values match, the decryption processing apparatus 200 may perform decryption processing on an encrypted compression header and obtain a decrypted compression header as a result of performing the decryption processing in operation S340. The size and/or location of the encrypted compression header can be found in the encryption header, and the type of an encryption algorithm used in encryption processing can also be found in metadata stored in the encryption header.

Next, the decryption processing apparatus 200 may perform decompression processing using the decrypted compression header and obtain original data as a result of performing the decompression processing in operation S350.

The decryption processing and the decompression processing included in the decryption processing method can also be performed without file input/output until the entire process is completed in a state where data to be decrypted is loaded in a memory as described above with reference to FIG. 10. Accordingly, the decryption processing process can also be performed at high speed.

For ease of understanding, an application example of the present disclosure will now be briefly described with reference to FIG. 13.

Figure 13:
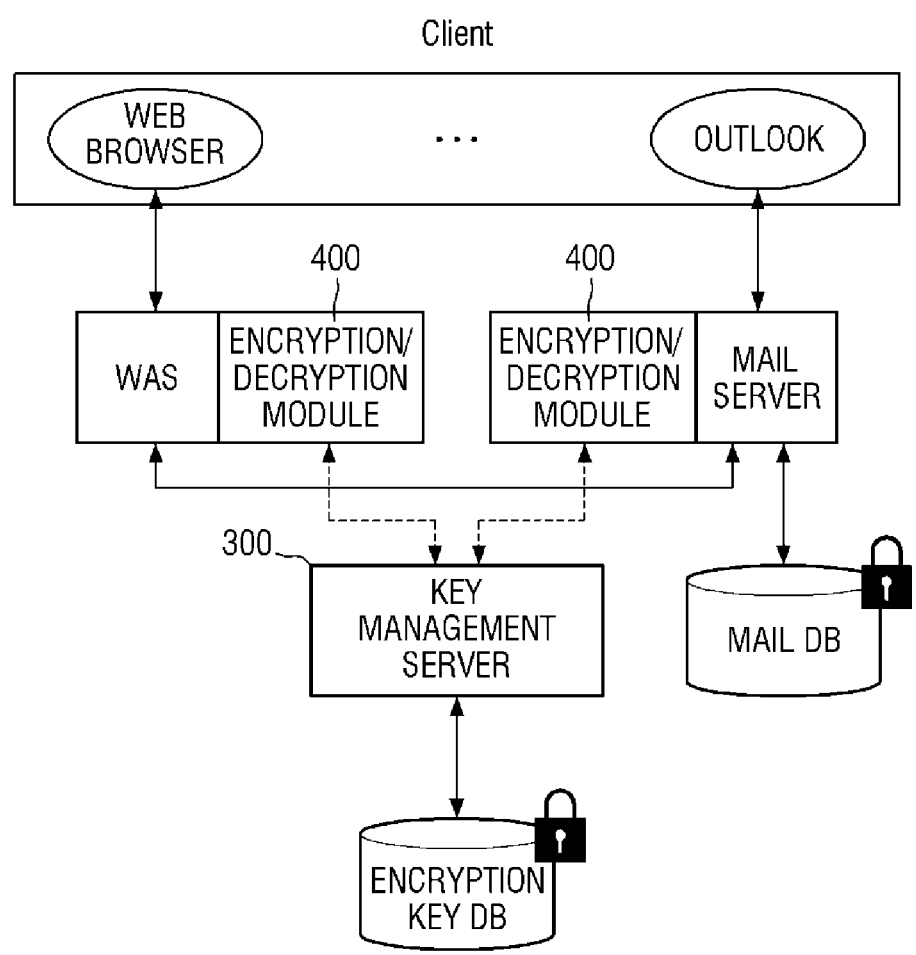
FIG. 13 illustrates the configuration of an email system according to an application example of the present disclosure.

FIG. 13 illustrates the exemplary configuration of an email system to which the present disclosure is applied.

Referring to FIG. 13, an encryption/decryption processing method according to an embodiment can be applied to an email system requiring real-time encryption/decryption processing. In the email system, an encryption/decryption module 400 may be a computer program or an encryption/decryption processing apparatus that performs the encryption/decryption processing method.

In the email system, a user views an email using a web browser or Outlook. Since the email may contain an attachment that is important from a security policy standpoint and sensitive personal information, it must be encrypted. In addition, since users usually want to quickly view even a large attachment, high-speed encryption/decryption processing is important.

In the email system, the encryption/decryption module 400 may be installed in, for example, a mail server and a WAS server that provides an email portal site to provide a high-speed encryption/decryption processing function. A key used for encryption/decryption may be received from an external key management server 300.

If the encryption/decryption module 400 according to the embodiment is installed in a mail server, etc. as described above, it is possible to provide a real-time email viewing function and ensure the security of email related data.

It should be noted that the email system illustrated in FIG. 13 is merely an application example of the present disclosure. The encryption/decryption processing method according to the embodiment can be applied to any system requiring high-speed encryption/decryption processing.

Figure 14:
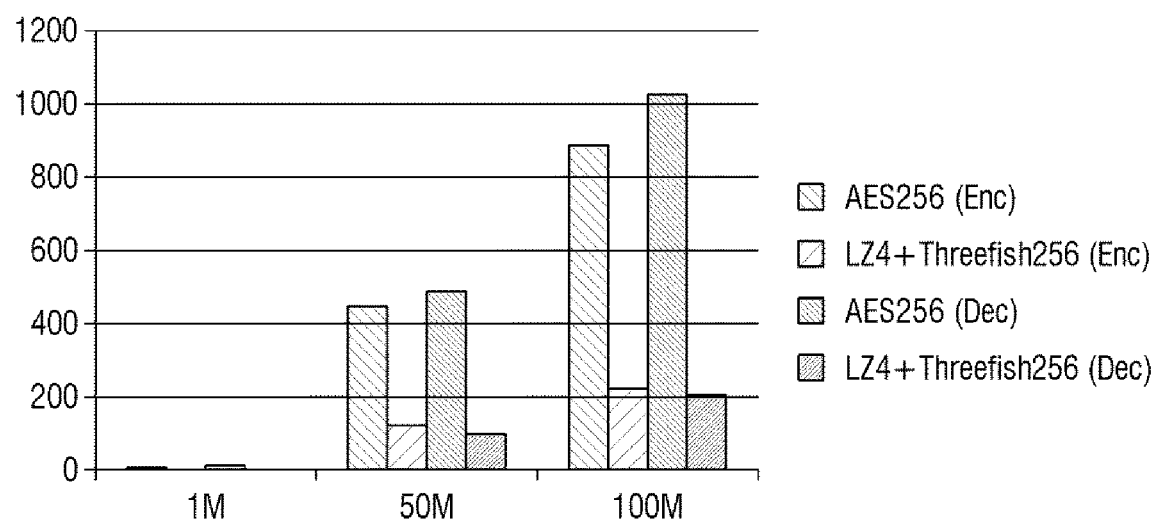
FIG. 14 is a diagram for comparing performance test results of the conventional art and the present disclosure.

Lastly, performance test results of the conventional art and the present disclosure will be briefly compared with reference to FIG. 14. In FIG. 14, the present disclosure was implemented using an 'LZ4' compression algorithm and a 'Threefish256' encryption algorithm, and an AES256 encryption algorithm widely used in the art was used for comparison. Since the above algorithms are already well known in the art, a description thereof will be omitted. In addition, in FIG. 14, the x-axis represents the size of data to be processed, the y-axis represents the average time (ms) required, and 'Enc' and 'Dec' respectively indicate an encryption processing process and a decryption processing process.

Referring to FIG. 14, it can be seen that encryption and decryption processing performed using the AES256 encryption algorithm requires much more time than encryption and decryption processing performed according to the present disclosure. In particular, the difference in performance is more noticeable as the size of data increases.

In addition, according to the performance test result of the present disclosure, it can be seen that even large data having a size of 100 M can be encrypted/decrypted within 200 ms. That is, the test results illustrated in FIG. 14 show that the present disclosure can provide high-speed encryption/decryption processing performance for large data.

According to the present disclosure described above, the size of data to be encrypted may be reduced through compression processing, and encryption may be performed only on a part of the compressed data. Accordingly, it is possible to provide high-speed encryption processing performance even for large data. Consequently, this can improve user-perceived performance of a system to which the present disclosure is applied and user satisfaction with the system.

In addition, encryption processing may be performed on a compression header generated by compression processing. Once the compression header encrypted, it is impossible to decompress the entire compressed data. That is, the security of the entire data can be effectively secured by encrypting only a part of the data.

Also, an encryption key may be encrypted and stored in an external key management system without being stored in an encryption processing apparatus or encrypted data. Accordingly, the security of data to be encrypted can be ensured unless the encryption key is leaked from the key management system.

In addition, different compression algorithms or different encryption algorithms may be applied to at least some of the data to be encrypted. Accordingly, data security is further increased.

Also, in a state where data to be encrypted is loaded in a memory, compression processing and encryption processing may be performed without file input/output during the encryption processing process on the data to be encrypted. Accordingly, since the number of file input/output operations is minimized, the encryption processing performance can be further improved.

However, the effects of the present disclosure are not restricted to the one set forth herein. The above and other effects of the present disclosure will become more apparent to one of daily skill in the art to which the present disclosure pertains by referencing the claims.

The concepts of the disclosure described above with reference to FIGS. 1 to 13 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. An encryption processing method, the encryption processing method comprising:
   generating a compression header indicating metadata for compression of unencrypted data;
   loading the compression header into a memory;
   loading the unencrypted data into the memory;
   encrypting the compression header in the memory;
   compressing the unencrypted data to obtain unencrypted compressed data in the memory, wherein the encrypting and the compressing are performed in parallel, and the encrypted compression header, the unencrypted compressed data and an encryption header form partially encrypted data; and
   storing the partially encrypted data in a file.

2. The encryption processing method of claim 1, further comprising:
   decrypting a section of the partially encrypted data which corresponds to the encrypted compression header to obtain the compression header; and
   decompressing the unencrypted compressed data by using the compression header.

3. The encryption processing method of claim 2, wherein the encryption header comprises a first hash value of an encryption key used in the encrypting the compression header, and
   wherein the decrypting the section comprises:
   generating a second hash value of a decryption key; and
   decrypting the section in response to determining that the second hash value of the decryption key matches the first hash value of the encryption key.

4. The encryption processing method of claim 1, wherein the compressing the unencrypted data comprises:
   selecting a compression algorithm from a plurality of compression algorithms; and
   compressing the unencrypted data based on the selected compression algorithm,
   wherein the compression header comprises identification data indicating the selected compression algorithm.

5. The encryption processing method of claim 1, wherein the encrypting the compression header comprises:
   selecting a first encryption algorithm and a second encryption algorithm from a plurality of encryption algorithms, wherein the first encryption algorithm is different from the second encryption algorithm;
   encrypting a first part of the compression header based on the first encryption algorithm; and
   encrypting a second part of the compression header based on the second encryption algorithm,
   wherein the encryption header comprises a first encryption header including identification data indicating the first encryption algorithm and a second encryption header including identification data indicating the second encryption algorithm.

6. The encryption processing method of claim 1, wherein an encryption key used in the encrypting is obtained from an external key management system and is not stored in an apparatus for processing the encrypting and not stored in the partially encrypted data.

7. The encryption processing method of claim 6, wherein the external key management system comprises:
   a key access server configured to provide the encryption key in response to an encryption key request from the encryption processing apparatus; and
   a master key management server configured to manage a master key used to encrypt the encryption key.

8. The encryption processing method of claim 1, wherein the encryption header comprises a hash value of an encryption key used in the encrypting.

9. The encryption processing method of claim 1, wherein the encryption header comprises information about a first size of the encrypted compression header and a second size of the unencrypted data.

10. An encryption processing apparatus comprising:
    a hardware processor;
    a memory configured to load a computer program to be executed by the hardware processor; and
    a storage configured to store the computer program,
    wherein the computer program, when executed by the hardware processor, causes the hardware processor to perform operations comprising:
    generating a compression header indicating metadata for compression of unencrypted data;
    loading the compression header into the memory;
    loading the unencrypted data into the memory;
    encrypting the compression header in the memory;
    compressing the unencrypted data to obtain unencrypted compressed data in the memory, wherein the encrypting and the compressing are performed in parallel, and the encrypted compression header, the unencrypted compressed data and an encryption header form partially encrypted data; and storing the partially encrypted data in a file.

11. A non-transitory computer-readable storage medium storing a computer program which, when executed by a processor of a computing apparatus, causes the processor to perform:

generating a compression header indicating metadata for compression of unencrypted data;

loading the compression header into a memory;

loading the unencrypted data into the memory;

encrypting the compression header in the memory;

compressing the unencrypted data to obtain unencrypted compressed data in the memory, wherein the encrypting and the compressing are performed in parallel, and the encrypted compression header, the unencrypted compressed data and an encryption header form partially encrypted data; and storing the partially encrypted data in a file.

* * * * *